(12) United States Patent
Gao et al.

(10) Patent No.: US 11,753,567 B2
(45) Date of Patent: Sep. 12, 2023

(54) ADHESIVE MATERIAL WITH IMPROVED BONDING PERFORMANCE TO A WET SUBSTRATE AND METHODS FOR PREPARING THE SAME

(71) Applicant: Nano and Advanced Materials Institute Limited, Hong Kong (HK)

(72) Inventors: Lei Gao, Hong Kong (HK); Su Ping Bao, Hong Kong (HK); Man Lung Sham, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 487 days.

(21) Appl. No.: 17/135,953

(22) Filed: Dec. 28, 2020

(65) Prior Publication Data

US 2021/0207008 A1 Jul. 8, 2021

Related U.S. Application Data

(60) Provisional application No. 62/958,323, filed on Jan. 8, 2020.

(51) Int. Cl.
  *C09J 11/08* (2006.01)
  *C09J 175/04* (2006.01)
  (Continued)

(52) U.S. Cl.
  CPC ............... *C09J 11/08* (2013.01); *C08K 3/013* (2018.01); *C08K 5/0025* (2013.01); *C08K 5/56* (2013.01);
  (Continued)

(58) Field of Classification Search
  None
  See application file for complete search history.

(56) References Cited

U.S. PATENT DOCUMENTS 4,257,932 A * 3/1981 Beers ...................... C08K 5/54
                                                528/901
6,506,577 B1   1/2003 Deming et al.
(Continued)

FOREIGN PATENT DOCUMENTS

CN    103965810 A    8/2014
CN    109762492 A    5/2019
(Continued)

OTHER PUBLICATIONS

KR20140118387A_machine_translation (Year: 2014).*
(Continued)

*Primary Examiner* — Francisco W Tschen
*Assistant Examiner* — Abhishek A Patwardhan
(74) *Attorney, Agent, or Firm* — Idea Intellectual Limited; Margaret A. Burke; Sam T. Yip

(57) ABSTRACT

The present invention provides an adhesive material with improved bonding performance to a wet substrate, the adhesive material includes a first component selected from a polysiloxane-based adhesive, or a polyurethane-based adhesive; and a second component of a catechol-containing polymeric additive which includes a reaction product of polyvinylpyrrolidone with 3',4'-dihydroxy-2-chloroacetophenone, and the weight ratio of polyvinylpyrrolidone to 3',4'-dihydroxy-2-chloroacetophenone ranging from 10:1 to 1:1. The adhesive material being a mixture of at least the first component and the second component, where the second component is approximately 1 wt. % to 10 wt. % of the first component.

17 Claims, 9 Drawing Sheets

(51) Int. Cl.
  *C09J 183/02* (2006.01)
  *C08L 39/06* (2006.01)
  *C08K 5/00* (2006.01)
  *C08K 5/56* (2006.01)
  *C08K 3/013* (2018.01)

(52) U.S. Cl.
  CPC ............. *C08L 39/06* (2013.01); *C09J 175/04* (2013.01); *C09J 183/02* (2013.01); *C09J 2475/00* (2013.01); *C09J 2483/00* (2013.01)

(56) References Cited

U.S. PATENT DOCUMENTS

| | | |
|---|---|---|
| 6,987,170 B1 | 1/2006 | Silverman et al. |
| 6,995,012 B1 | 2/2006 | Silverman et al. |
| 7,622,533 B2 | 11/2009 | Lee |
| 7,622,550 B2 | 11/2009 | Cha et al. |
| 7,943,703 B2 | 5/2011 | Shull et al. |
| 8,227,628 B2 | 7/2012 | Messersmith et al. |
| 2003/0087338 A1 | 5/2003 | Messersmith et al. |
| 2005/0201974 A1 | 9/2005 | Schestopol et al. |
| 2008/0295960 A1 | 12/2008 | Schalau, II et al. |
| 2012/0065308 A1* | 3/2012 | Sumi ..................... C08L 83/04 524/145 |
| 2016/0220727 A1 | 8/2016 | Lu et al. |
| 2018/0256777 A1 | 9/2018 | Delmotte et al. |
| 2019/0194508 A1* | 6/2019 | Bao ........................ C09J 183/06 |

FOREIGN PATENT DOCUMENTS

| | | | |
|---|---|---|---|
| CN | 110016318 A | | 7/2019 |
| KR | 20140118387 A | * | 10/2014 |
| KR | 20140118387 A | | 10/2014 |
| KR | 20190046050 A | | 5/2019 |
| WO | WO-2021248098 A1 | * | 12/2021 |

OTHER PUBLICATIONS

Huang Kelong, "Technical Manual for Fine Chemicals", Central South University of Technology Press, 1994.

2nd Office Action of corresponding China Patent Application No. 202011640049.5 dated Dec. 2, 2022.

Office Action of corresponding China Patent Application No. 202011640049.5 dated Jun. 30, 2022.

\* cited by examiner

ADHESIVE MATERIAL WITH IMPROVED BONDING PERFORMANCE TO A WET SUBSTRATE AND METHODS FOR PREPARING THE SAME

CROSS-REFERENCE TO RELATED APPLICATIONS

This application claims priority from the U.S. provisional patent application Ser. No. 62/958,323 filed Jan. 8, 2020, and the disclosure of which is incorporated herein by reference in its entirety.

FIELD OF THE INVENTION

The present invention relates to a catechol-containing polymeric additive and its application in polymer adhesives and sealants for a variety of applications on dry or wet surfaces. More particularly, the additive made from catechol-containing compounds and polymers can be added into various polymer adhesive systems and has a wide application to building and construction fields.

BACKGROUND

Adhesives are widely used in various fields such as building and construction for either structural or non-structural applications. There many synthetic adhesives which may be simply classified as elastomers, thermoplastics, emulsions, and thermosets. In general, a dry and clean substrate is necessary for good adhesion. However, there are many scenarios where wet surfaces may be encountered, such as curing concrete under damp outdoor conditions, surfaces after rain, wet pipe surfaces or even underwater conditions, etc. In these cases, most of the traditional adhesives can only provide very weak adhesion or even result in de-bonding. The reason is that when an adhesive is applied to wet substrates, the functional groups of the adhesive may interact with water instead of forming adhesive bonds with the substrate surface.

It is well known that organisms such as mussels can adhere to multiple surfaces under both dry and wet conditions. The protein produced from the byssus of mussels contains a high content of catechol groups; such catechol groups may be responsible for the special adhesive ability of mussels. During the last decade, new strategies for fabricating multi-functional underwater adhesives were developed by exploiting adhesive characteristics of catechol functional groups. Although the exact nature of such protein-protein interactions is still unknown, the unusual amino acid 3,4-dihydroxyphenylalanine (DOPA) may be the central to curing of mussel adhesive proteins. Therefore, it is speculated that the protein produced from the byssus of mussels can be used as a kind of bio-adhesive. However, the collection of this protein directly from mussels is very difficult and not cost-effective.

Compared with a recombinant approach to produce mussel adhesive proteins, chemical synthesis may be another approach in which large-scale production is possible, showing that adhesives can be made by conjugating catechol functional groups to polymers via various chemical reactions. Based on this approach, the synthesized catechol-containing compounds and polymers could be used as a bio-adhesive or a bio-sealant on biological surfaces.

U.S. Pat. No. 8,227,628 discloses a chemical synthesis approach for synthesizing acetonide-protected catechol-containing compounds having at least one amine group. The catechol-containing compounds include 3,4-dihydroxyphenylalanine, Fmoc-protected H-DOPA(acetonide)-OH, Fmoc-protected dopamine, TFA-protected dopamine, and acetonide-protected 4-(2-aminoethyl)benzene-1,2-diol.

U.S. Pat. No. 7,622,533 discloses a method for synthesizing polymeric compounds such as dihydroxyphenyl derivatives (DHPD) with surface-active effects. The polymer backbone of the desired polymer has structural or performance features that can be tailored to control physical properties.

U.S. Pat. No. 6,506,577 discloses the crosslinking of a catechol-containing co-polypeptide. The resulting networks are water-based and show bonding capabilities toward wet materials such as biological tissues.

US20030087338 discloses a route for the conjugation of DOPA moieties to various polymeric systems, including poly(ethylene glycol) or poly(alkylene oxide) systems such as poly(ethylene oxide)-poly(propylene oxide)-poly(ethylene oxide) block copolymers. These resulting polymers can used as biomimetic adhesive for biomedical applications.

US20050201974 discloses a compound containing an aromatic group, which contains one or more hydroxyl groups, that is grafted onto a polymer or coupled to individual monomers. The compound displays bio-adhesive properties and may be used in therapeutic and diagnostic applications.

U.S. Pat. No. 7,943,703 discloses a method for creating a bio-adhesive in a substantially aqueous environment. The method includes reacting the poly(methyl methacrylate-methacrylic acid-methyl methacrylate) block copolymer with 3,4-dihydroxyphenylalanine to obtain a catechol-containing copolymer. Hydrogels were formed by exposing the solutions to saturated water vapor to provide a bio-adhesive in an aqueous environment.

US20180256777 relates to compositions and methods to seal tissue of a patient under wet conditions, particularly to an additive for surgical adhesives and sealants to improve adhesion to wet surfaces.

However, for the known adhesives described above, the sophisticated fabrication processes make their transfer into practical applications and especially integration of them with existing systems difficult, hence most of the above materials' uses are limited to medical applications such as drug delivery and surgical repair. Large-volume applications such as those in construction have not been addressed by the prior art. There is a need in the art for new adhesion products with improved adhesive properties on wet surfaces to meet the requirement of high adhesion in building and construction applications.

SUMMARY OF THE INVENTION

The present invention is not to be limited in scope by any of the following descriptions. The following examples or embodiments are presented for exemplification only.

The present invention provides a novel approach to preparation of bio-inspired polymeric additives for in sealants and adhesives that may be used in construction and building applications.

Accordingly, an object of this invention is to provide an adhesive material with improved bonding performance to a wet substrate, which includes a first component selected from a polysiloxane-based adhesive, or a polyurethane-based adhesive; and a second component of a catechol-containing polymeric additive which includes a reaction product of polyvinylpyrrolidone with 3',4'-dihydroxy-2-chloroacetophenone, with the weight ratio of polyvinylpyrrolidone to 3',4'-dihydroxy-2-chloroacetophenone ranging from 10:1 to 1:1. The adhesive material is a mixture of at least the first component and the second component, wherein the second component is approximately 1 wt. % to 10 wt. % of the first component. Preferably, the second component is approximately 1 wt. % to 5 wt. % of the first component.

The second object of the present invention is to provide a method of preparation of a silicone sealant with improved adhesive performance on a wet substrate, the method includes (1) reacting polyvinylpyrrolidone (PVP) with 3',4'-dihydroxy-2-chloroacetophenone to synthesize a catechol-containing polymeric additive; (2) forming a base material by mixing the catechol-containing polymeric additive with a liquid polyorganosiloxane polymer and a branched silicone oil, wherein the amount of the polymeric additive is in the range of 1-5 wt % of the base material; and (3) mixing the base material with a cross-linking agent and a catalyst to synthesize a silicone sealant with improved adhesive performance on a wet substrate.

BRIEF DESCRIPTION OF THE DRAWINGS

Embodiments of the present invention are described in more detail hereinafter with reference to the drawings, in which.

DETAILED DESCRIPTION

In the following description, the present invention provides the preparation of a catechol-containing polymeric additive and the addition of the bio-inspired polymeric additive into sealants and adhesives to improve the adhesive performance on a wet surface. It will be apparent to those skilled in the art that modifications, including additions and/or substitutions may be made without departing from the scope and the spirit of the invention, as set forth in the appended claims. Specific details may be omitted so as not to obscure the invention; however, the disclosure is written to enable one skilled in the art to practice the teachings herein without undue experimentation.

The present invention provides an adhesive material with improved bonding performance to a wet substrate, which includes a first component selected from a polysiloxane-based adhesive, or a polyurethane-based adhesive; and a second component of a catechol-containing polymeric additive which includes a reaction product of polyvinylpyrrolidone to 3',4'-dihydroxy-2-chloroacetophenone, and the weight ratio of polyvinylpyrrolidone to 3',4'-dihydroxy-2-chloroacetophenone ranging from 10:1 to 1:1. The adhesive material is a mixture of at least the first component and the second component, wherein the second component is approximately 1 wt. % to 10 wt. % of the first component. Preferably, the second component is approximately 1 wt. % to 5 wt. % of the first component.

The present invention further provides a method of preparation of a silicone sealant with improved adhesive performance on a wet substrate, the method includes (1) reacting polyvinylpyrrolidone (PVP) with 3',4'-dihydroxy-2-chloroacetophenone to synthesize a catechol-containing polymeric additive; (2) forming a base material by mixing the catechol-containing polymeric additive with a liquid polyorganosiloxane polymer and a branched silicone oil, wherein the amount of the polymeric additive is in the range of 1-5 wt % of the base material; and (3) mixing the base material with a cross-linking agent and a catalyst to synthesize a silicone sealant with improved adhesive performance on a wet substrate.

Figure 2:
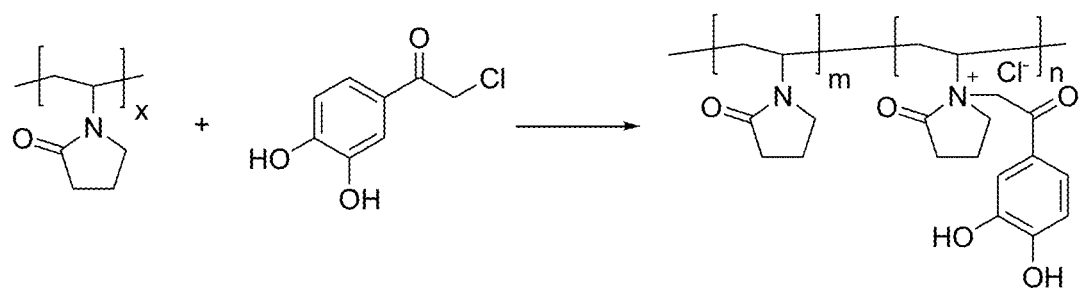
FIG. 2 schematically depicts the synthesis of a catechol-containing polymeric additive.

To create the adhesives of the present invention, a catechol-containing polymeric additive has been developed. The catechol-containing polymeric additive is a reaction product of polyvinylpyrrolidone with 3',4'-dihydroxy-2-chloroacetophenone. This reaction product may be economically synthesized by a one-step reaction. FIG. 2 schematically depicts the reaction of polyvinylpyrrolidone (PVP) and 3',4'-dihydroxy-2-chloroacetophenone. The molecular weight of the PVP is not critical and may vary from approximately 3500 to 1760000. The PVP may be used in a linear form or a cross-linked form. The cross-linked PVP may be a low degree of cross-linking, which is water-soluble; or a high degree of cross-linking, which is almost water-insoluble.

The reaction may be performed under an air atmosphere or an inert atmosphere (e.g., nitrogen, argon) and under a temperature in the range of room temperature up to a boiling point of the reaction product; the reaction time is in the range of 3 to 24 hours. After reaction, PVP forms the main backbone of the reaction product with large numbers of catechol groups connected on a side chain of the PVP backbone. In the reaction product of FIG. 2, wherein the ratio m/n is between approximately 14/1 to 2/1 and the total value of m+n is between approximately 30-16000. The weight ratio of polyvinylpyrrolidone (PVP) to 3',4'-dihydroxy-2-chloroacetophenone ranges from approximately 10:1 to approximately 1:1.

The catechol-containing polymer reaction product of FIG. 2 is used as an additive for various adhesives to enable the adhesives to be applied to wet surfaces. These adhesives may be known, commercially-available adhesives such that the present invention can be employed in commercial-scale construction applications. In particular, the reaction product may be added to a polysiloxane-based adhesive, a polyurethane-based adhesive, acrylate-based adhesive, or epoxy-based adhesive. The polysiloxane-based adhesive has a formula of $[R_2SiO]_n$, where R is an organic group selected from ethyl, methyl, or phenyl; n is an integer between 200 and 500. A PU-adhesive is composed of organic units joined by carbamate (urethane) links —NH—(C=O)—O—. Importantly, the catechol-containing polymeric additive has excellent compatibility with a wide variety of adhesives so that it is possible to fully disperse the additive into various adhesives.

The polyorganosiloxane polymer can be hydroxyl-terminated or alkoxyl-terminated. In its liquid form, the polyorganosiloxane polymer has a viscosity of 25 to 1,000,000 cSt at 25° C. In the adhesives of the present invention, various additives may be included along with the catechol-containing reaction product and base adhesive. In one embodiment, when polyorganosiloxane is used as the base adhesive, a branched silicone oil may be included. The branched silicone oil has a viscosity of 25 to 10,000 cSt at 25° C., and it may be present in the range of 5-20 wt % of the base adhesive. A further additive may be an inorganic filler material. The inorganic filler may be a reinforcing nanofiller which can improve the mechanical properties of the resultant adhesive. The filler may include one or more of fumed silica, precipitated silica, nano calcium carbonate, precipitated calcium carbonate, ground calcium carbonate, iron oxide, titanium dioxide, carbon black, mica, or aluminium oxide. The total amount of the inorganic filler may be in the range of 30-70 wt % of the base adhesive material.

Figure 3:
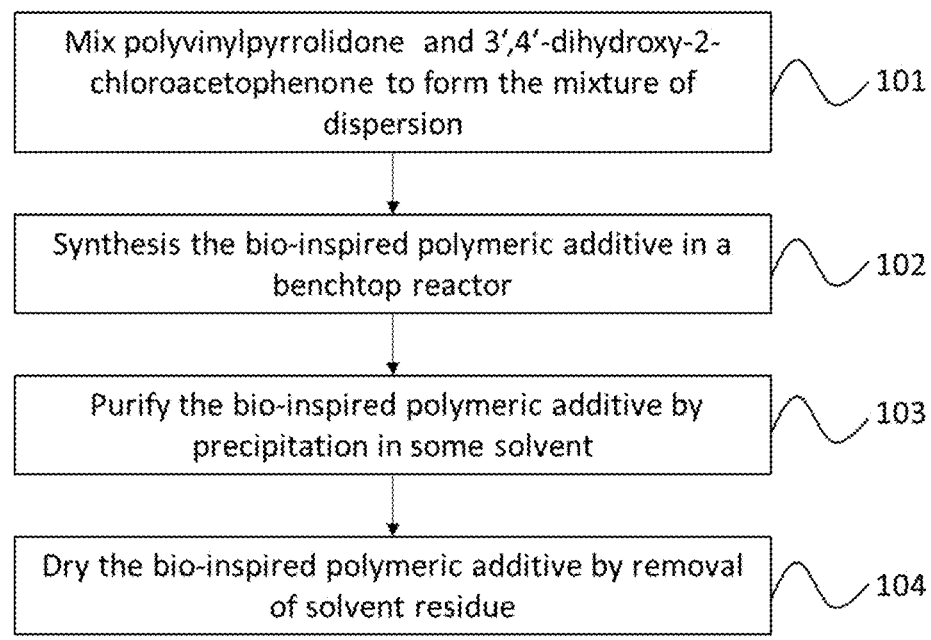
FIG. 3 depicts the manufacturing processes of bio-inspired polymeric additive.

The present invention also relates to the methods of preparing the adhesive. First, the cathechol-containing polymer additive is formed. FIG. 3 depicts a flow chart showing the manufacturing processes of the catechol-containing polymeric additive. In step 101 and step 102, the catechol-containing polymeric additive is synthesized by reacting polyvinylpyrrolidone (PVP) with 3',4'-dihydroxy-2-chloroacetophenone. This step is performed under an air atmosphere or an inert atmosphere (e.g., nitrogen, argon) and at a temperature in the range of room temperature up to a boiling point of the reaction product, which is approximately 75-100° C. and the reaction time is in the range of 3 to 24 hours.

In one embodiment, the method further includes the option of using a solvent during the reaction. For example, a solvent is selected such as water, methanol, ethanol, isopropanol or the mixture of these solvents.

In step 103 and step 104, a resulting catechol-containing polymeric additive is purified by precipitation. The precipitation may be in a solvent such as diethyl ether, hexane, or acetone. The precipitant is typically a dark, viscous material. The material may optionally be dried using a freeze dryer or a vacuum pump to remove any solvent residue and obtain a dark color solid product. The product may be formed into a powder state by grinding.

Figure 4:
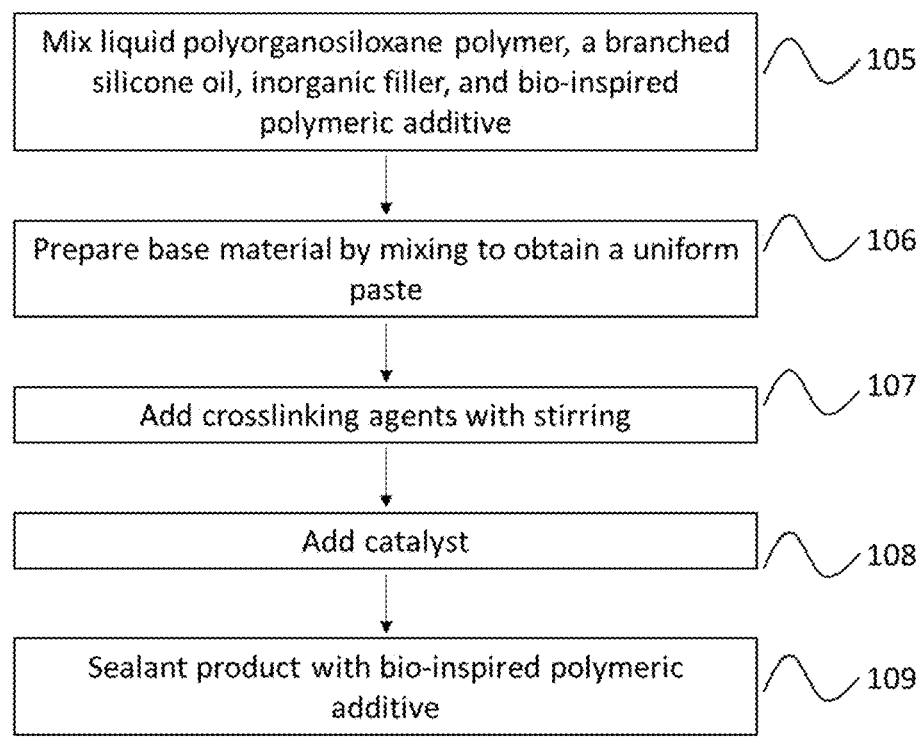
FIG. 4 depicts the process of synthesizing a sealant product with bio-inspired polymeric additive.

FIG. 4 depicts the formation of the inventive adhesive though the addition of the catechol-containing polymeric additive to an adhesive. In step 105, a base adhesive material is selected. In this embodiment, the base adhesive material is a liquid polyorganosiloxane polymer. The liquid polyorganosiloxane polymer, a branched silicone oil, and an inorganic filler together form the base material. In step 106, these components of the base material are mixed with the catechol-containing polymeric additive produced according to the steps of FIG. 3; the moisture of the base material is removed to form a uniform paste. In order to ensure the catechol-containing polymeric additive is well dispersed, the catechol-containing polymeric additive can be first dispersed in a solvent such as methanol or ethanol before mixing with the components of base material; the catechol-containing polymeric additive is included in an amount from approximately 1-5 wt % of the base material.

The mixture may be mixed in a planetary mixer at room temperature and constant pressure for 0.5-1 hour to form a uniform paste, followed by stirring for another 1-5 hours. More particularly, heating and vacuum may be used during the process. The temperature is in the range of 90-150° C. The degree of vacuum is in the range of –0.05 to –0.1 MPa.

In steps 107 and step 108, a cross-linking agent and a catalyst are added to form the inventive adhesive. After the reaction, in step 109, a silicone sealant with catechol-containing polymeric additive may be prepared as a paste of high viscosity.

The total amount of the cross-linking agent that is added is in the range of approximately 0.1-4 wt % of the silicone sealant (polyorganosiloxane and filler), and the total amount of the catalyst added is in the range of approximately 0.1-4 wt % of the silicone sealant (polyorganosiloxane and filler). The cross-linking agent includes two and/or three groups that are reactive with silicon-bonded hydroxyl groups of polymers. Exemplary cross-linking agents include vinyltrimethoxysilane (ViTMS), vinyltriethoxysilane (ViTES), dimethoxydimethylsilane (DMDMS), vinylmethyldimethoxysilane (ViMDMS), triethoxymethylsilane (TEMS), poly(methyltriethoxysilane) (polyMTES), methyltrimethoxysilane (MTMS), tetraethyl orthosilicate (TEOS), methyltris(methylethylketoxime)silane (MTMOS), vinyltris(methylethylketoximine)silane (ViTMOS), or phenyltris(methylethylketoxime)silane (PhTMOS). The catalyst may be selected from organometallic compounds and/or complexes which can catalyze the curing of a cure system in the presence of moisture. For example, tin-free titanium compounds and/or complexes, or a mixture of different titanium catalysts can be used for adhesive synthesis, such as tetrabutyl titanate, isopropyl titanate, and titanium chelate complexes.

Figure 5:
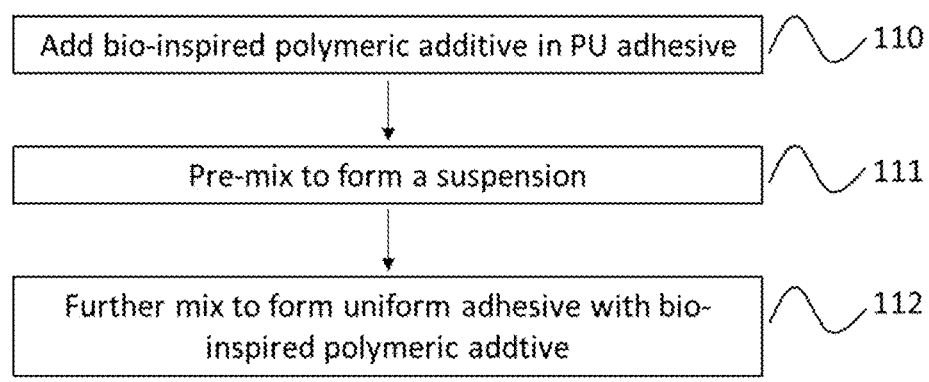
FIG. 5 depicts the process of synthesizing an adhesive material with bio-inspired polymeric additive.

In another embodiment, the base adhesive is a polyurethane-based adhesive. FIG. 5 depicts the formation of a polyurethane-based adhesive with a cathechol-containing polymer additive.

In step 110, the catechol-containing polymeric additive is added to a polyurethane-based adhesive or a polyurethane-based adhesive to form a mixture. The catechol-containing polymeric additive may be added in a solid state or as a mixture with solvents such as methanol or ethanol. The amount of the catechol-containing polymeric additive added in the polyurethane adhesive or the polyurethane-based adhesive is in the range of approximately 1 wt % up to approximately 5 wt %. In step 111, the mixture is pre-mixed to obtain a viscous suspension by mechanical stirring, shear dispersion, or three-roll milling.

In order to adequately mix the catechol-containing polymeric additive in the adhesive, mechanical dispersion methods were performed, including mechanical stirring, shear dispersion, or three-roll milling. In step 112, the mixture is re-mixed by the three-roll milling for three times to form a uniform polyurethane adhesive with improved adhesive performance on a wet substrate.

In one embodiment, other additives may be provided together with the catechol-containing polymeric additive. For example, these additives may include calcium oxide, magnesium oxide, calcium chloride (anhydrous), magnesium chloride (anhydrous), sodium sulfate (anhydrous), magnesium sulfate (anhydrous), or the mixture of above. The total amount of these additives is lower than approximately 10 wt % of the mixture.

Figure 6:
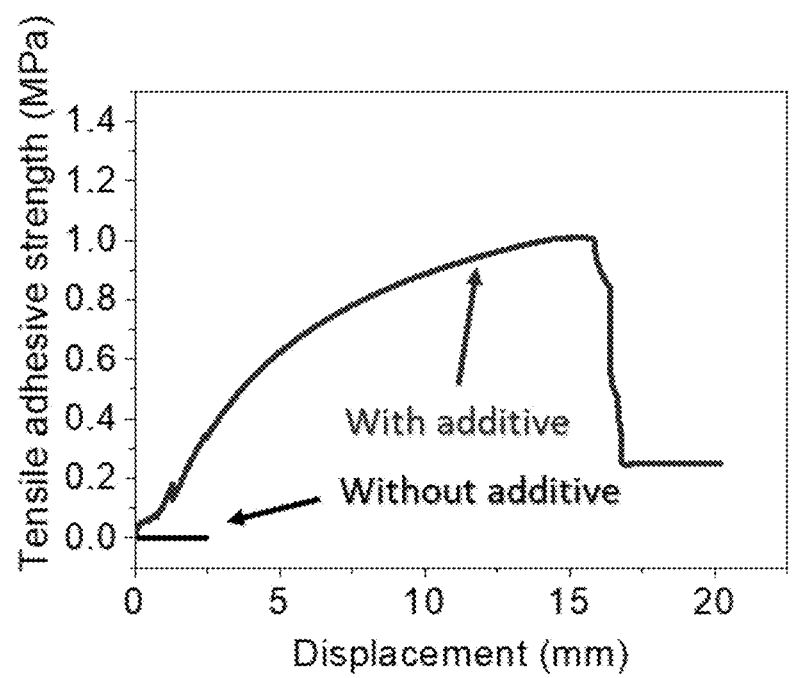
FIG. 6 provides the tensile adhesive strength of the silicone sealant with or without catechol-containing polymeric additive.

The resulting silicone sealant and polyurethane adhesive with catechol-containing polymeric additive were tested according to a series of international standards. For silicone sealant, tensile strength and elongation were tested using a universal testing system (MTS, model E104) according to ASTM D 412. Tensile adhesive strength on a dry or a wet substrate was carried out according to ISO 8339. Flow test was carried out according to ISO 7390. Tack free time test was carried out according to ASTM C679. In FIG. 6, as the displacement increases, it can be observed that the silicone sealant with catechol-containing polymeric additive has higher tensile adhesive strength which is in the range of 0-150 MPa. However, when the displacement becomes more than 15 mm, the tensile adhesive strength will be greatly reduced to about 30 MPa and remain stable.

Figure 7:
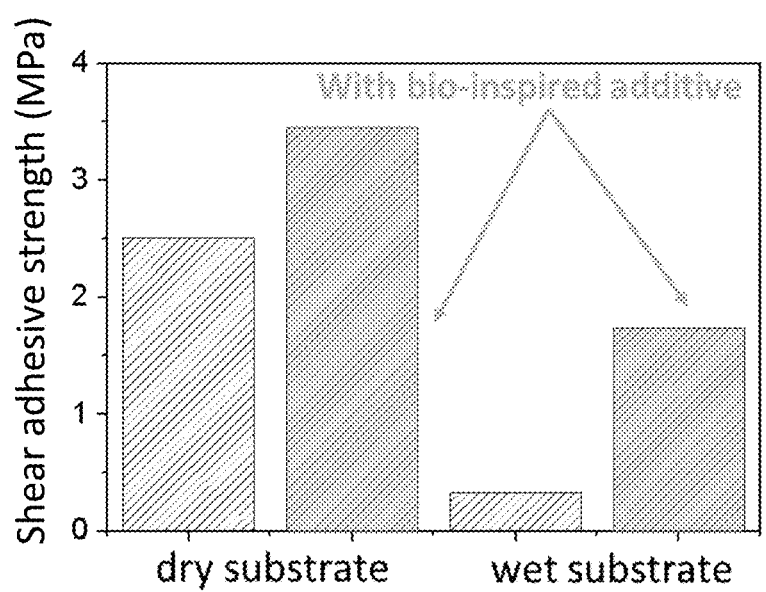
FIG. 7 provides the shear adhesive strength of adhesives with or without catechol-containing polymeric additive on dry or wet substrates.

For each adhesive, a lap shear strength test was carried out according to ASTM D1002. The rheological properties of the adhesives were characterized on a HAAKE MARS III rotational rheometer. As shown in the FIG. 7, it can be observed that no matter on dry or wet substrates, an adhesive with catechol-containing polymeric additive has higher shear adhesive strength than an adhesive without additive.

Figure 8:
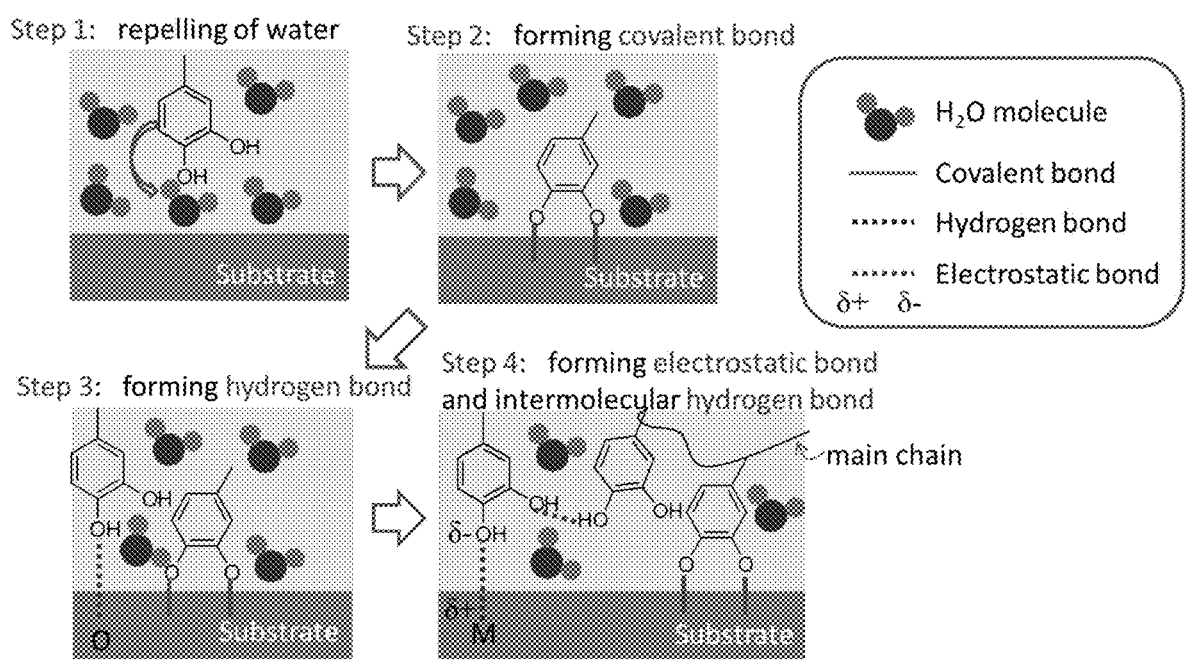
FIG. 8 depicts a proposed mechanism of interaction between bio-inspired polymer with wet substrate.
Figure 9:
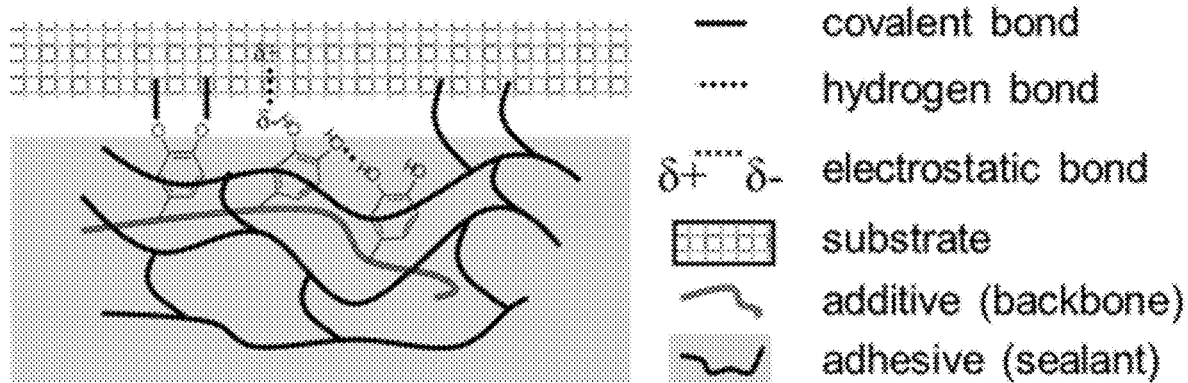
FIG. 9 depicts a proposed final structure of bio-inspired polymeric additive in adhesive (sealant) with substrate.

Without being bound by any particular theory, a mechanism of improved bonding to wet surfaces is depicted with reference to FIGS. 8 and 9. In FIG. 8, the cathecol groups initially repel the water in step 1, with formation of a covalent bond in step 2. Hydrogen bonds are formed in step 3 and electrostatic and intermolecular hydrogen bonds in step 4. Note that these steps are not necessarily in chronological order and different bonds may happen in a different order depending on proximity.

FIG. 9 also depicts the covalent, hydrogen, and electrostatic bonds in relation to catechol-containing additive backbone molecules and adhesive molecules.

EXAMPLES

Example 1

A Typical Procedure for Preparation of a Catechol-Containing Polymeric Additive

In one embodiment, the preparation of a catechol-containing polymeric additive is performed by a one-litre benchtop reactor. 100 g of polyvinylpyrrolidone (PVP) and 50 g of 3',4'-dihydroxy-2-chloroacetophenone were added into the reactor, and then 150 mL of ethanol was added into the reactor to obtain a dark mixture. The reaction was carried out with a stirring speed of 200 rpm at 70° C. under a nitrogen atmosphere. After reacting for 7 hours, the mixture was cooled down to room temperature, and the product was further precipitated in 300 mL of cold diethyl ether. Freeze drying was used for removal of the solvent residue in the bio-inspired polymeric additive product to obtain a dark brown product (solid state, 145 g). The product in a powder state was obtained by grinding by a pulverizer.

Example 2

A Typical Procedure for Preparation of a Silicone Sealant with Catechol-Containing Polymeric Additive The preparation of a silicone sealant with a catechol-containing polymeric additive was carried out in a five-litre planetary mixer which is equipped with a high-speed dispersion disc. For a 2 kg scale experiment, a typical procedure is as follow:

(a) 700 g of alkoxyl-terminated polyorganosiloxane polymer with a viscosity of 20,000 cSt was added into a planetary mixer;
(b) 300 g of branched silicone oil was added;
(c) 1000 g of calcium carbonate nano-filler was added;
(d) 20 g of catechol-containing polymeric additive dispersed in 50 mL of ethanol was added;
(e) The above mixture was mixed in the planetary mixer under room temperature and constant pressure for 0.5 hour with a speed of 30 rpm. Therefore, a uniform paste was obtained after this step;
(f) Next, the mixture was stirred for another 3-4 hours at 130° C. under a vacuum (−0.090 MPa or lower), where the mixed speed is 50 rpm and with high speed dispersion (300 rpm);
(g) The base material was obtained by cooling down the mixture under vacuum (−0.090 MPa or lower) below 60° C., and the mixing speed is 50 rpm;
(h) A mixture of cross-linking agent includes 10 mL of dimethyl dimethoxy silane and 50 mL of vinyl trimethoxy silane was added into the base material under a nitrogen atmosphere, and the mixing speed is 50 rpm;
(i) The mixture was mixed for another 0.5 hour under a vacuum (−0.070 MPa), and the mixed speed is 50 rpm and with high speed dispersion (300 rpm);
(j) The mixture was cooled down to 50° C. or below. Then, 40 mL of titanium complex catalyst was added under a nitrogen atmosphere with a mixing speed 50 rpm for 15 min;
(k) The mixture was mixed under a mixing speed 50 rpm with high speed dispersion (300 rpm), and under a vacuum (−0.070 MPa) for another 1 hour before obtaining the final silicone sealant with catechol-containing polymeric additive (about 1% of catechol-containing polymeric additive).

Figure 1:
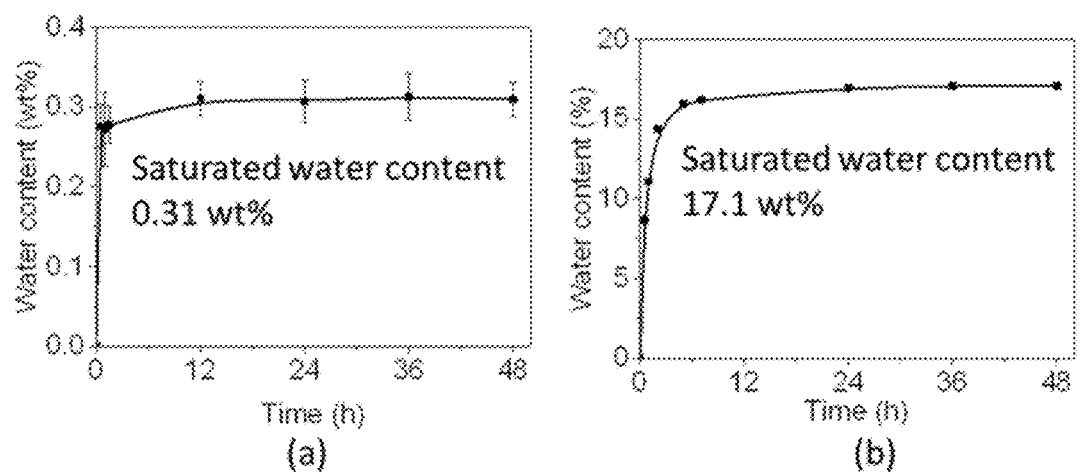
FIG. 1 shows the water content curves of granite board and cement board.

To test the adhesive properties of the materials, two typical substrates were selected. These substrates are granite board and cement board, which are widely used in the construction applications. Since it is to study the wet adhesion of coatings, adhesives, and sealants, the water contents of the substrates are important. The dry substrates were obtained under the ambient condition (room temperature and humidity 50 to 60% RH), and the wet substrates were obtained by immersion of these substrates into DI water for at least 24 hours. The water contents of the two substrates were detected by a water content meter, and the water content curves are shown in FIG. 1. Although the saturated water contents of the two substrates are quite different, the water absorption behaviour is similar. As an example, the water content increases quickly during the first several hours, and being close saturated water content after immersion in water for 12 hours. Until 24, 36, and 48 hours, the water content still remains constant.

The wet substrates were obtained by immersion of these substrates in DI water for at least 24 hours to achieve the saturated state. The water content of the wet granite (FIG. 1A) and the wet cement board (FIG. 1B) are 0.31% and 17.1%, respectively. The water content of the dry granite and the dry cement board are 0.10% and 9.6%, respectively.

In addition to testing the adhesion of the inventive materials, a silicone sealant without any catechol-containing polymeric additive was prepared using the same procedure as set forth above. The performance of silicone sealants with and without catechol-containing polymeric additive are listed in Table 1.

TABLE 1

|  | Silicone sealant without additive | Silicone sealant with catechol-containing polymeric additive (~1 wt%) |
|---|---|---|
| Tack free time (min) | 25 | 25 |
| Flow (mm) | 0 | 0 |
| Tensile strength (MPa) | 2.22 | 1.51 |
| Elongation (%) | 450 | 300 |
| Tensile adhesive | 1.10 (cement board) | 1.03 (cement board) |

TABLE 1-continued

|  | Silicone sealant without additive | Silicone sealant with catechol-containing polymeric additive (~1 wt%) |
|---|---|---|
| strength on dry substrates (MPa) | 1.30 (granite board) | 1.23 (granite board) |
| Tensile adhesive strength on wet substrates (MPa) | 0 (cement board) 0.10 (granite board) | 0.66 (cement board) 0.71 (granite board) |

Example 3

A Typical Procedure for Preparation of Polyurethane Adhesive with Catechol-Containing Polymeric Additive 100 g of one-part polyurethane adhesive was added into a 250 mL beaker, and then 5 g of the catechol-containing polymeric additive was added. Next, the mixture was stirred at ca. 200 rpm for 5 min for pre-mixing to obtain a viscous suspension. After that, the mixture was further mixed by a three-roll milling for three times to form a uniform polyurethane adhesive with improved adhesive performance on a wet substrate, where the working spacing was 50-90 µm.

In another example, 2 g anhydrous calcium chloride powder was added together with 5 g of catechol-containing polymeric additive in the same one-part polyurethane adhesive by using the same procedure. The performance of the polyurethane adhesive with and without catechol-containing polymeric additive is listed in Table 2.

TABLE 2

|  | polyurethane adhesive without additive | Polyurethane adhesive with catechol-containing polymeric additive (5%) | Polyurethane adhesive with bio-inspired polymeric additive (5%) and calcium chloride (2%) |
|---|---|---|---|
| Initial viscosity | 2300 | 2800 | 2900 |
| Shear adhesive strength on dry substrate (MPa) | 2.79 (cement board) 3.14 (granite board) | 3.05 (cement board) 2.83 (granite board) | 3.45 (cement board) 3.27 (granite board) |
| Shear adhesive strength on wet substrate (MPa) | 0.23 (cement board) 0.30 (granite board) | 1.25 (cement board) 1.33 (granite board) | 1.66 (cement board) 1.75 (granite board) |

Definitions

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they allow for elements not explicitly recited, but exclude elements that are found in the prior art or that affect a basic or novel characteristic of the present invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

In the methods of preparation described herein, the steps can be carried out in any order without departing from the principles of the invention, except when a temporal or operational sequence is explicitly recited. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps can also be repeated. Furthermore, specified steps can be carried out concurrently unless explicit claim language recites that they be carried out separately.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Other definitions for selected terms used herein may be found within the detailed description of the present invention and apply throughout. Unless otherwise defined, all other technical terms used herein have the same meaning as commonly understood to one of ordinary skill in the art to which the present invention belongs.

It will be appreciated by those skilled in the art, in view of these teachings, that alternative embodiments may be implemented without deviating from the spirit or scope of the invention, as set forth in the appended claims. This invention is to be limited only by the following claims, which include all such embodiments and modifications when viewed in conjunction with the above specification and accompanying drawings.

The invention claimed is:

1. An adhesive material with improved bonding performance to a wet substrate comprising:
   a first component selected from a polysiloxane-based adhesive, or a polyurethane-based adhesive;
   a second component of a catechol-containing polymeric additive, the catechol-containing polymeric additive comprising a reaction product of polyvinylpyrrolidone with 3',4'-dihydroxy-2-chloroacetophenone, the weight ratio of polyvinylpyrrolidone to 3',4'-dihydroxy-2-chloroacetophenone ranging from 10:1 to 1:1;

the adhesive material being a mixture of at least the first component and the second component, wherein the second component is approximately 1 wt. % to 10 wt. % of the first component.

2. The adhesive material of claim 1, further comprising an inorganic filler in an amount of approximately 30 wt. % to approximately 70 wt. %.

3. The adhesive material of claim 2, wherein the inorganic filler is selected from one or more of fumed silica, precipitated silica, nano calcium carbonate, precipitated calcium carbonate, ground calcium carbonate, iron oxide, titanium dioxide, carbon black, mica, or aluminum oxide.

4. The adhesive material of claim 1, wherein the second component is represented by the following formula (I):

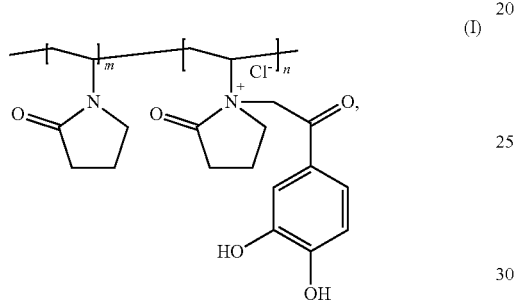

wherein the ratio m/n is between approximately 14/1 to 2/1 and the total value of m+n is between approximately 30-16000.

5. The adhesive material of claim 1, further comprising one or more additives selected from calcium oxide, magnesium oxide, calcium chloride (anhydrous), magnesium chloride (anhydrous), sodium sulfate (anhydrous), magnesium sulfate (anhydrous).

6. The adhesive material of claim 1, wherein the polysiloxane has a formula of $[R_2SiO]_n$, where R is an organic group selected from ethyl, methyl, or phenyl; n is an integer between 200 and 500.

7. The adhesive material of claim 1, wherein the second component is approximately 1 wt. % to 5 wt. % of the first component.

8. A method of preparation of a silicone sealant with improved adhesive performance on a wet substrate, the method comprising:

reacting polyvinylpyrrolidone (PVP) with 3',4'-dihydroxy-2-chloroacetophenone to synthesize a catechol-containing polymeric additive;

forming a base material by mixing the catechol-containing polymeric additive with a liquid polyorganosiloxane polymer and a branched silicone oil, wherein the amount of the polymeric additive is in the range of 1-10 wt % of the base material;

mixing the base material with a cross-linking agent and a catalyst to synthesize a silicone sealant with improved adhesive performance on a wet substrate.

9. The method of claim 8, wherein the molecular weight of the PVP is approximately 3500 to 1760000 and wherein the PVP is a linear or a cross-linked form.

10. The method of claim 8, further comprising using a solvent in the reaction of polyvinylpyrrolidone with 3',4'-dihydroxy-2-chloroacetophenone, wherein the solvent comprises water, methanol, ethanol, isopropanol, or combination thereof.

11. The method of claim 8, wherein the PVP and the 3',4'-dihydroxy-2-chloroacetophenone have a weight ratio of 10:1 to 1:1.

12. The method of claim 8, wherein the catechol-containing polymeric additive is represented by the following formula (I):

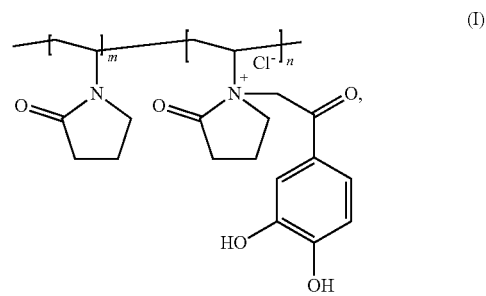

wherein the ratio m/n is between approximately 14/1 to 2/1 and the total value of m+n is between approximately 30-16000.

13. The method of claim 8, further comprising purifying the catechol-containing polymeric additive prior to mixing with the polysiloxane.

14. The method of claim 8, further comprising an inorganic filler selected from one or more of fumed silica, precipitated silica, nano calcium carbonate, precipitated calcium carbonate, ground calcium carbonate, iron oxide, titanium dioxide, carbon black, mica, or aluminum oxide.

15. The method of claim 8, wherein the cross-linking agent comprises vinyltrimethoxysilane (ViTMS), vinyltriethoxysilane (ViTES), dimethoxydimethylsilane (DMDMS), vinylmethyldimethoxysilane (ViMDMS), triethoxymethyl silane (TEMS), poly(methyltriethoxysilane) (polyMTES), methyltrimethoxysilane (MTMS), tetraethyl orthosilicate (TEOS), methyltris(methylethylketoxime)silane (MTMOS), vinyltris(methylethylketoximine)silane (ViTMOS), or phenyltris(methylethylketoxime)silane (PhTMOS).

16. The method of claim 8, wherein the catalyst comprises tetrabutyl titanate, isopropyl titanate, or a titanium chelate complex.

17. The method of claim 8, wherein the amount of the polymeric additive is in the range of 1-5 wt % of the base material.

* * * * *